United States Patent
Chalapalli et al.

(10) Patent No.: US 9,930,302 B2
(45) Date of Patent: Mar. 27, 2018

(54) SCREEN BURN-IN PREVENTION AND REDUCTION MANAGEMENT

(71) Applicant: Samsung Electronics Co., Ltd., Suwon-si, Gyeonggi-do (KR)

(72) Inventors: Naga Ramesh Chalapalli, Mountain View, CA (US); David Tompkins, Mountain View, CA (US); Michael Ricker, Mountain View, CA (US); Sundararajan Chellappan, Mountain View, CA (US); Ataur Rahman Khan, Mountain View, CA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 148 days.

(21) Appl. No.: 15/018,487

(22) Filed: Feb. 8, 2016

(65) Prior Publication Data

US 2017/0230625 A1  Aug. 10, 2017

(51) Int. Cl.
*H04N 9/12* (2006.01)
*G09G 5/02* (2006.01)

(52) U.S. Cl.
CPC .......... *H04N 9/12* (2013.01); *G09G 5/02* (2013.01); *G09G 2320/046* (2013.01)

(58) Field of Classification Search
CPC ....... G09G 2320/046; G09G 2320/048; G09G 2320/08; G06F 3/0481; G06F 17/30699
See application file for complete search history.

(56) References Cited

U.S. PATENT DOCUMENTS

| 5,819,284 A * | 10/1998 | Farber .............. G06F 17/30699 707/999.004 |
| 6,507,351 B1 * | 1/2003 | Bixler .................. G06F 3/0481 707/E17.108 |
| 2014/0267325 A1 * | 9/2014 | Jiang ..................... G06F 1/3218 345/520 |

OTHER PUBLICATIONS

YouTube Video; Title: "Stuck Pixel Fixer—11 hours—Jscreen *HD reupload*"; Publication Date: Aug. 29, 2012.*
YouTube Video; Title: "液晶やきつき改善 (Remove LCD image burn-in)"; Publication Date: Mar. 8, 2014.*
Kannon Yamada, "Save Your Screen: How to Prevent Burn-in on AMOLED Screens", www.makeuseof.com/tag/author/kyamada/, Apr. 20, 2015, 8 pgs.

* cited by examiner

*Primary Examiner* — Sepehr Azari (57) ABSTRACT

A method, system, and computer-readable medium for managing screen burn-in. The method includes identifying information about an electronic device having a display. The method also includes determining a version of a video be sent to the electronic device and one or more times for the electronic device to display the determined video version based on the identified information. Additionally, the method includes sending information about the determined video version and the one or more times to the electronic device. The video includes display of a sequence of different colors for different durations designed to at least remediate or reduce screen burn-in of the display.

20 Claims, 5 Drawing Sheets

SCREEN BURN-IN PREVENTION AND REDUCTION MANAGEMENT

TECHNICAL FIELD

This disclosure relates generally to display technology. More specifically, this disclosure relates to screen burn-in prevention and reduction management.

BACKGROUND

Screen burn-in, image burn-in, or ghost image, collectively referred to herein as screen burn-in, is a discoloration of areas on an display that are visible when the display is powered on and/or visible over currently displayed images or graphics. Screen burn-in is caused by non-uniform usage of pixels of the display, particularly, constant or semi-static display of a certain image or graphics for a prolonged period of time. This problem may be particularly significant in a retail demonstration environment where images or graphics, such as those associated with a home page or setup message, are displayed during business hours to attract customers. For example, a demonstration attractor loop that plays non-stop over an extended period of time may eventually cause screen burn-in on the display. In another example, device error messages that stay on for extended period of time until being attended to can also cause screen burn-in on the display.

SUMMARY

Embodiments of the present disclosure provide screen burn-in prevention and reduction management.

In one embodiment, a method for managing screen burn-in is provided. The method includes identifying information about an electronic device having a display. The method also includes determining a version of a video be sent to the electronic device and one or more times for the electronic device to display the determined video version based on the identified information. Additionally, the method includes sending information about the determined video version and the one or more times to the electronic device. The video includes display of a sequence of different colors for different durations designed to at least remediate or reduce screen burn-in of the display.

In another embodiment, a system for managing screen burn-in is provided. The system includes a memory, at least one processor operably connected to the memory, and a communication interface. The at least one processor is configured to identify information about an electronic device having a display; and determine a version of a video to be sent to the electronic device and one or more times for the electronic device to display the determined video version based on the identified information. The communication interface is configured to send information about the determined video version and the one or more times to the electronic device. The video includes display of a sequence of different colors for different durations designed to at least remediate or reduce screen burn-in of the display.

In yet another embodiment, a computer-readable medium for managing screen burn-in is provided. The computer-readable medium comprises program code that, when executed by at least one processor, causes a system to identify information about an electronic device having a display, determine a version of a video to be sent to the electronic device and one or more times for the electronic device to display the determined video version based on the identified information, and send information about the determined video version and the one or more times to the electronic device. The video includes display of a sequence of different colors for different durations designed to remediate or reduce screen burn-in of the display.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device or Universal Serial Bus (USB) accessible flash memory.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that screen burn-in can have disadvantages including reduced operability of a display for an electronic device. In particular, in a retail environment, screen burn-in may result in unnecessary costs to periodically replace device displays as well as reducing the ability for retail customers to be able to see and view the intended retail demonstration experience and capabilities of the electronic device. Accordingly, embodiments of the present disclosure provide screen burn-in prevention and reduction management for electronic device displays.

Figure 1:
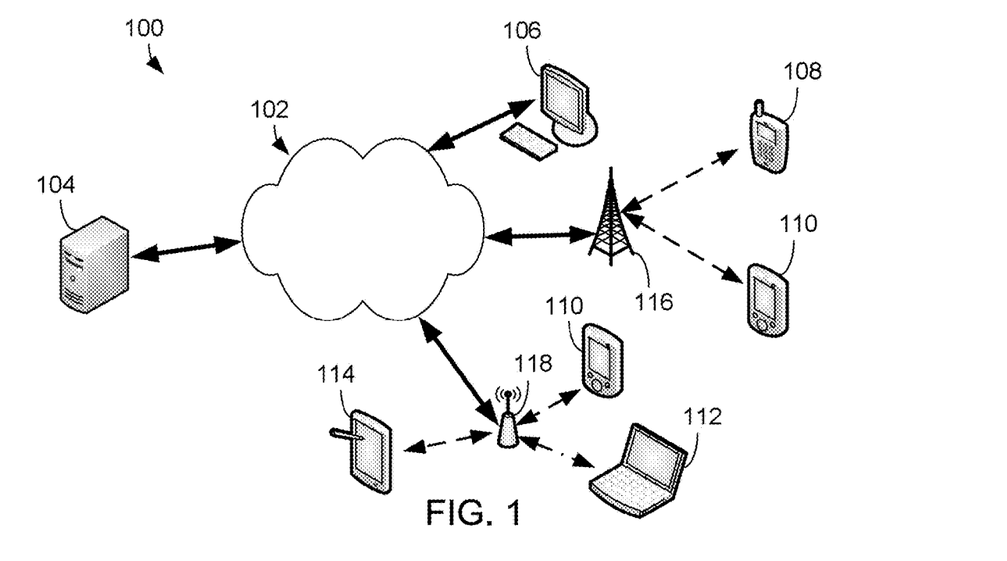
FIG. 1 illustrates an example communication system in which various embodiments of the present disclosure may be implemented.

FIG. 1 illustrates an example communication system 100 in which various embodiments of the present disclosure may be implemented. The embodiment of the communication system 100 shown in FIG. 1 is for illustration only. Other embodiments of the communication system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, or other information between network addresses. The network 102 may include one or more local area networks (LANs); metropolitan area networks (MANs); wide area networks (WANs); all or a portion of a global network, such as the Internet; or any other communication system or systems at one or more locations.

The network 102 facilitates communications between at least one server 104 and various client devices 106-114. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or communication device with a display that interacts with at least one server or other computing device(s) over the network 102. In this example, the client devices 106-114 include electronic devices, such as, for example, a desktop computer 106, a mobile telephones or smartphones 108, a personal digital assistant (PDA) 110, a laptop computer 112, a tablet computer 114, a media player, a media streaming device, a television, a wearable device, smart watch, etc. However, any other or additional client devices could be used in the communication system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points (Aps) 118, such as IEEE 802.11 wireless APs, Bluetooth, and Wifi direct. Note that these are for illustration only and that each client device could communicate directly with the network 102 or indirectly with the network 102 via any suitable intermediate device(s) or network(s).

As described in more detail below, the server 104 identifies one or more of the client devices 106-114 that may need screen burn-in prevention or remediation and provides particularly designed videos for display by the identified client device(s) 106-114 for screen burn-in prevention and reduction management. For example, one or more of the client devices 106-114 may be located in a retail environment with constant or semi-static images or graphics being displayed by the client devices 106-114 for extended durations of time. The server 104 may be a server in a content management system (CMS) that identifies and provides screen burn-in prevention or remediation management to such client devices 106-114.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
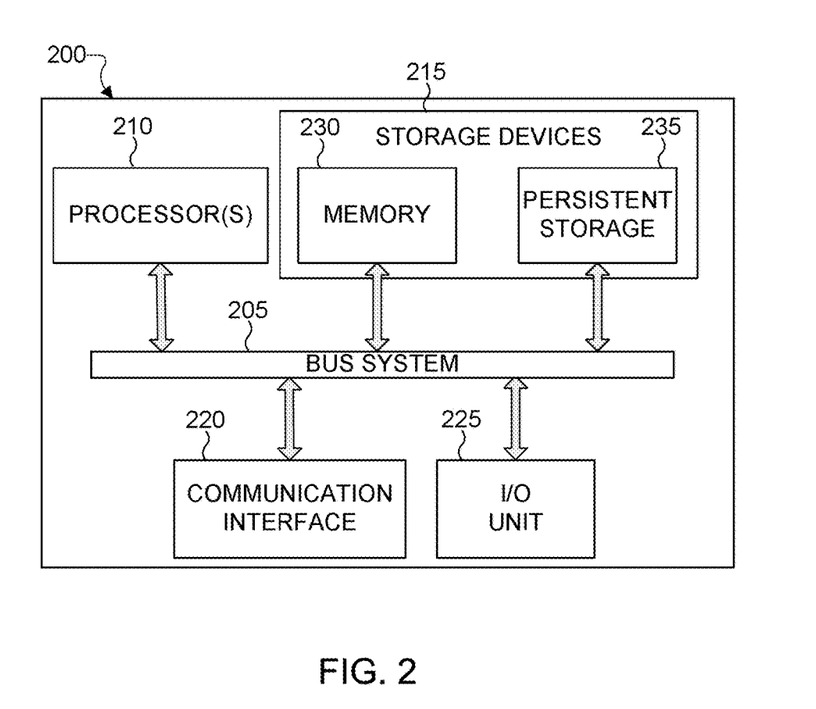
FIG. 2 illustrates an example server according to various embodiments of the present disclosure.
Figure 3:
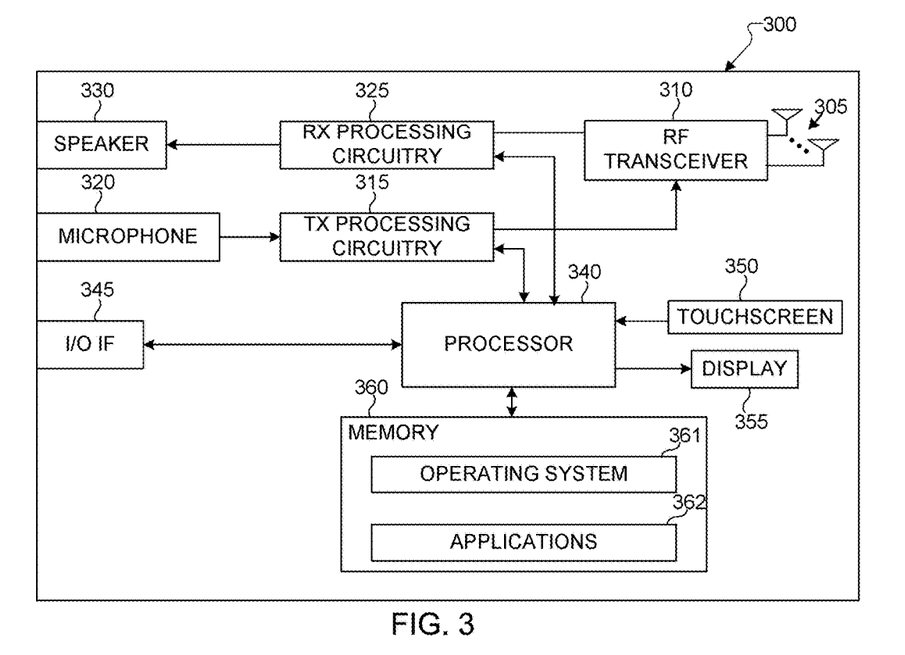
FIG. 3 illustrates an example electronic device according to various embodiments of the present disclosure.

FIGS. 2 and 3 illustrate example electronic devices in a communication system according to various embodiments of the present disclosure. In particular, FIG. 2 illustrates an example server 200, and FIG. 3 illustrates an example electronic device 300. In this illustrative example, the server 200 represents the server 104 in FIG. 1, and the electronic device 300 could represent one or more of the client devices 106-114 in FIG. 1.

As shown in FIG. 2, the server 200 includes a bus system 205, which supports communication between at least one processor 210, at least one storage device 215, at least one transmitter/receiver 220, and at least one input/output (I/O) unit 225.

The processor 210 executes instructions that may be loaded into a memory 230. The processor 210 may include any suitable number(s) and type(s) of processors or other devices in any suitable arrangement. Example types of processor 210 include microprocessors, microcontrollers, digital signal processors, field programmable gate arrays, application specific integrated circuits, and discreet circuitry. The processor 210 may be a general-purpose CPU or specific purpose processor for encoding or decoding of video data.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a read-only memory, hard drive, Flash memory, or optical disc.

The transmitter/receiver 220 supports communications with other systems or devices. For example, the transmitter/receiver 220 could include a network interface card or a wireless transceiver facilitating communications over the network 102. The transmitter/receiver 220 may support communications through any suitable physical or wireless communication link(s). The transmitter/receiver 220 may include only one or both of a transmitter and receiver, for example, only a receiver may be included in a decoder or only a transmitter may be included in an encoder.

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

As described in more detail below, the server 200 may be a server in a CMS that identifies and provides screen burn-in prevention or remediation management for display devices. For example, the server 200 may identify and provide screen burn-in prevention or remediation management for displays on one or more of the client devices 106-114 that are located in a retail environment with constant or semi-static images or graphics being displayed by the client devices 106-114 for extended durations of time.

FIG. 3 illustrates an example electronic device 300 according to various embodiments of the present disclosure. The embodiment of the electronic device 300 illustrated in FIG. 3 is for illustration only, and the client devices 106-114 of FIG. 1 could have the same or similar configuration. However, electronic devices come in a wide variety of configurations, and FIG. 3B does not limit the scope of this disclosure to any particular implementation of an electronic device.

As shown in FIG. 3, the electronic device 300 includes an antenna(s) 305, a radio frequency (RF) transceiver 310, TX processing circuitry 315, a microphone 320, and receive (RX) processing circuitry 325. The electronic device 300 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors and execute the OS program 361 stored in the memory 360 in order to control the overall operation of the electronic device 300. In some embodiments, the processor 340 includes at least one microprocessor or microcontroller.

The processor 340 is also capable of executing other processes and programs resident in the memory 360, such as operations that receive, store, and timely instruct the display of videos for screen burn-in prevention and reduction management. The processor 340 can move data into or out of the memory 360 as required by an executing process. In some embodiments, the processor 340 is configured to execute a plurality of applications 362, such as applications for managing the timing and display of videos for screen burn-in prevention and reduction, for example, during a retail mode or night mode for the electronic device 300.

The processor 340 can operate the plurality of applications 362 based on the OS program 361. The main processor 340 is also coupled to the I/O interface 345, which provides electronic device 300 with the ability to connect to other devices such as laptop computers and handheld computers. The I/O interface 345 is the communication path between these accessories and the main controller 340.

The processor 340 is also coupled to the touchscreen 350 and the display 355. The operator of the electronic device 300 can use the touchscreen 350 to enter data into the electronic device 300. The display 355 may be a may be a liquid crystal display, a light-emitting diode (LED) display, an optical LED (OLED), an active matrix OLED (AMOLED), or other display capable of rendering text and/or at least limited graphics, such as from web sites. In some embodiments, the touchscreen 350 and the display 355 may be combined and/or integrated together, for example, in a Super AMOLED display.

Embodiments of the present disclosure recognize and take into account that AMOLED displays are composed of active matrix organic light-emitting diodes. The organic compounds used in AMOLED displays may degrade with use. The chemistry involved in creating the electroluminescence may be irreversible. As a result, the luminous pixels degrade as the pixels are used up. These organic materials tend to crystallize, which is an effect that is intensified at higher temperatures. As described in more detail below, the electronic device 300 may be located in a retail environment with constant or semi-static images or graphics being displayed by the display 355 for extended durations of time. As a result, the display 355 may be vulnerable to negative effects of the semi-static images or graphics being "burned into" the display 355. In accordance with various embodiments of the present disclosure, the display 355 displays specifically designed videos for preventing, reducing, and/or remediating possible negative effects of screen burn-in on the display 355.

The memory 360 is coupled to the processor 340. Part of the memory 360 could include a random access memory (RAM), and another part of the memory 360 could include a Flash memory or other read-only memory (ROM).

Although FIGS. 2 and 3 illustrate examples of devices in a communication system, various changes may be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the electronic device 300 configured as a mobile telephone or smartphone, electronic devices could be configured to operate as other types of mobile or stationary devices. In addition, as with computing and communication networks, client devices and servers can come in a wide variety of configurations, and FIGS. 2 and 3 do not limit this disclosure to any particular electronic devices.

Various embodiments of the present disclosure provide for managing screen burn-in on the display of an electronic device. Various embodiments provide for the creative use of red, green, and blue (RGB) color patterns a video that is displayed by the electronic device to reduce/eliminate discoloration of pixels in the display. In some embodiments, a period of time is also scheduled for the display of the electronic device to be automatically powered off to prevent unnecessary usage of the display.

Figure 4:
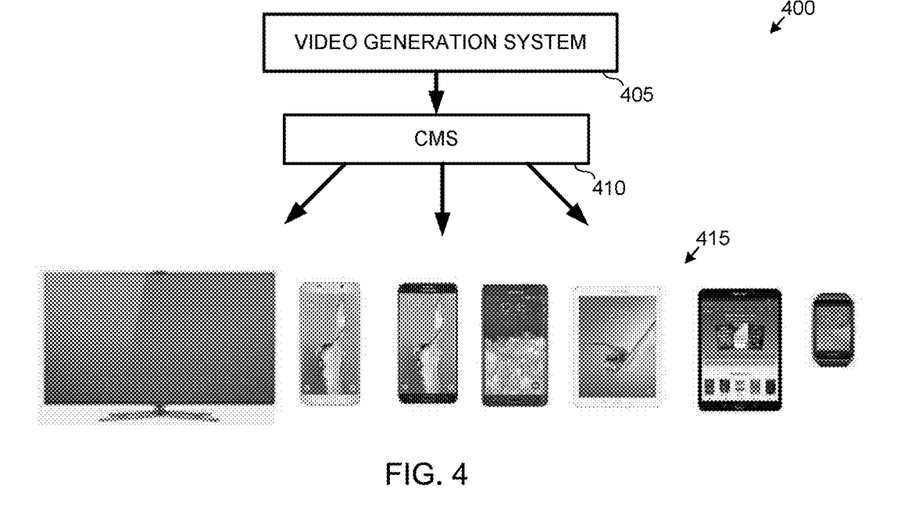
FIG. 4 illustrates a block diagram of a system for managing screen burn-in according to various embodiments of the present disclosure.

FIG. 4 illustrates a block diagram of a system 400 for managing screen burn-in according to various embodiments of the present disclosure. The system 400 is an example of at least a part of the communication system 100 in FIG. 1. The embodiment of the system 400 shown in FIG. 4 is for illustration only. Other embodiments of the system 400 could be used without departing from the scope of the present disclosure.

System 400 includes a video generation system 405 that generates the videos used to reduce or prevent screen burn-in for the electronic devices 415. For example, the video generation system 405 may be implemented by the server 104 or any of the client devices 106-114 and the electronic devices 415 may be implemented by any of the client devices 106-114. For example, without limitation, the electronic devices 415 may be a mobile telephone, smartphone, a PDA, a laptop computer, a tablet computer, a computer monitor, a television, a wearable device, smart watch, or any other type of electronic device that has a display that may be susceptible to screen burn-in.

Video generation system 405 includes researched various RGB color patterns/algorithms for the videos that may be tested and fine-tuned using displays that already had screen burn-in as well as displays that are susceptible to screen burn-in. For example, the videos produced include unique solid RGB color patterns to address a variety of screen burn-in.

Figure 5A:
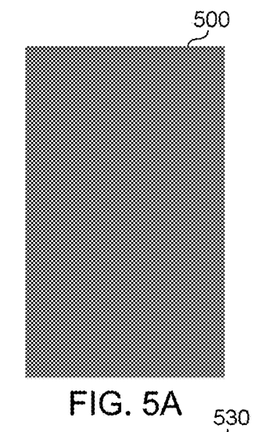
FIGS. 5A-5I illustrate example frames of a video designed to at least remediate or reduce screen burn-in according to various embodiments of the present disclosure.
Figure 5B:
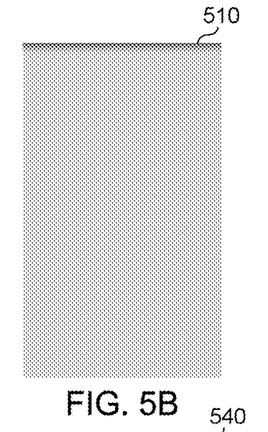
Figure 5C:
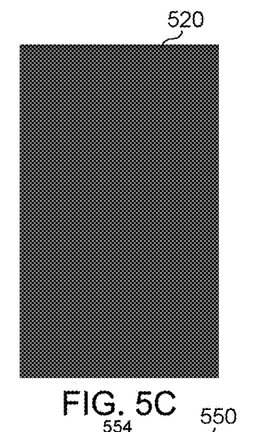
Figure 5D:
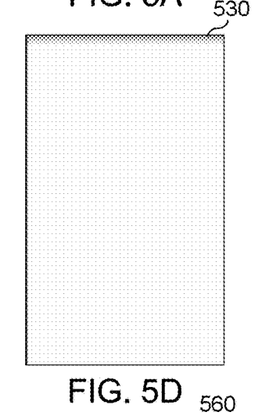
Figure 5E:
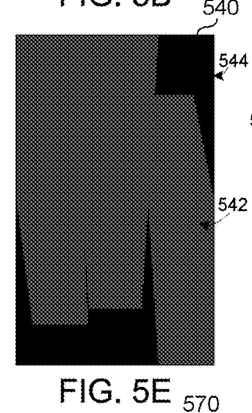

For example and without limitation, unique elements of the RGB color patterns/algorithms that may be used by the video generation system 405 to generate the videos include videos of different total length, varying the time intervals between full screen display of RGB frames, transitioning between RGB colors (in any order) various times (e.g., anywhere from 2 milliseconds to 1 second apart), creatively using black and white colors while transitioning between RGB colors, and usage of different types of transitions between full screen display of RGB frames. FIGS. 5A-5C illustrate example full screen display frames of red 500, green 510, and blue frames 530, respectively. FIGS. 5D and 5E illustrate example usage of black and white colors while transitioning between RGB colors. For example, FIG. 5D illustrates display of a white full screen frame 530 that may be positioned between two or more of the red, green, and blue frames in the pattern or sequence of colors for the videos. FIG. 5E illustrates display of a frame 540 including a rotating type of transition of the blue color 542 (e.g., where the blue color 545 is rotated in or out to or from a full screen blue display, such as display 520 in FIG. 5C) while the background of the transition is a black color 544.

Figure 5F:
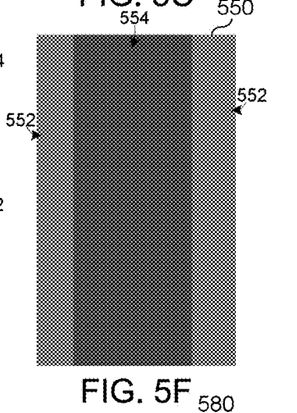

For example and without limitation, example types of transitions that may be used by the video generation system 405 to generate the videos include transitioning from one end of the display to the other end (e.g., top to bottom and left to right), the rotating transition (e.g., as discussed above with regard to FIG. 5E), and transitioning from edges of the display and vice versa. For example, any one of the displayed colors of frames 500-530 may be panned or rolled onto the display from the top to bottom and left to right and vice versa. In another example, one color may be rolled or panned onto the display from an edge or center of the display as illustrated by way of example, by frame 550 in FIG. 5 F. In this example, frame 550 is a display of a transition between red 552 and blue colors 554 or vice versa.

Figure 5G:
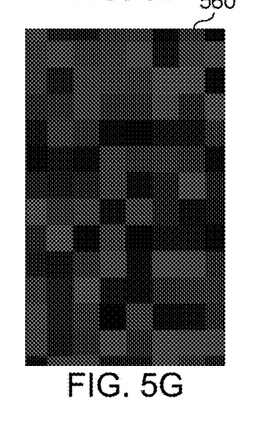
Figure 5H:
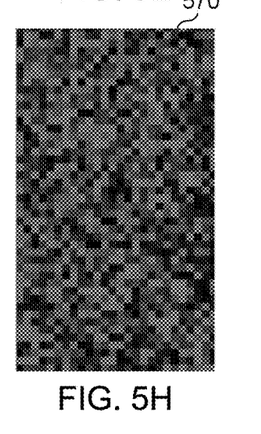
Figure 5I:
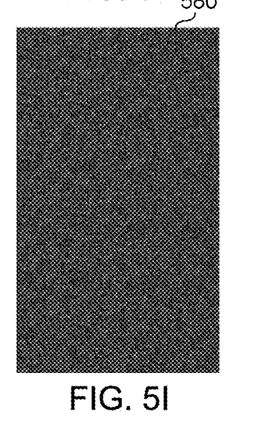

In another example, instead of and/or in addition to using solid color frames, such as frames 500-530, the video generation system 405 may include frames 560-580 that have pixels or groups of pixels with different colors. FIGS. 5G-5I illustrate display frames 560-580 including successively smaller grouping of different colored pixels (e.g., coarser versus finer resolution of pixel color groups). For example, individual pixels or groups of pixels may include varying shades of a color, e.g., shades varying from solid blue to solid black as illustrated in FIG. 5G or shades varying from solid red to solid black as illustrated in FIGS. 5H and 5I. In another example, the pixel groups may include shades varying among any of the RGB colors, or may include different pixel groups of different solid RGB colors. In yet another example, the video generation system 405 may use a transition between colors using groups of pixels with the transitioning colors (e.g., transitions between colors using fine to course groups of different color pixel groups and vice versa).

The examples of the frames shown in FIGS. 5A-5I are for illustration only. Other examples can be used without departing from the scope of the present disclosure. For example, any color may be used instead of or in addition to red, green, and blue, (e.g., based on the types of pixels used in a particular type of display). In another example, other types of color patterns and transitions may be used.

Figure 6A:
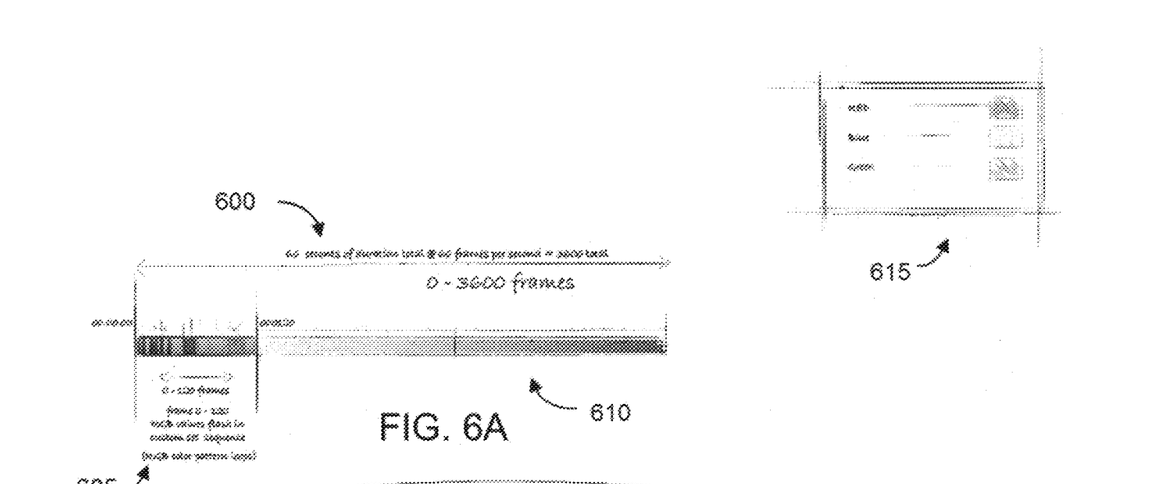
FIGS. 6A and 6B illustrate an example sequence of video frames for a video according to one embodiment of the present disclosure.
Figure 6B:
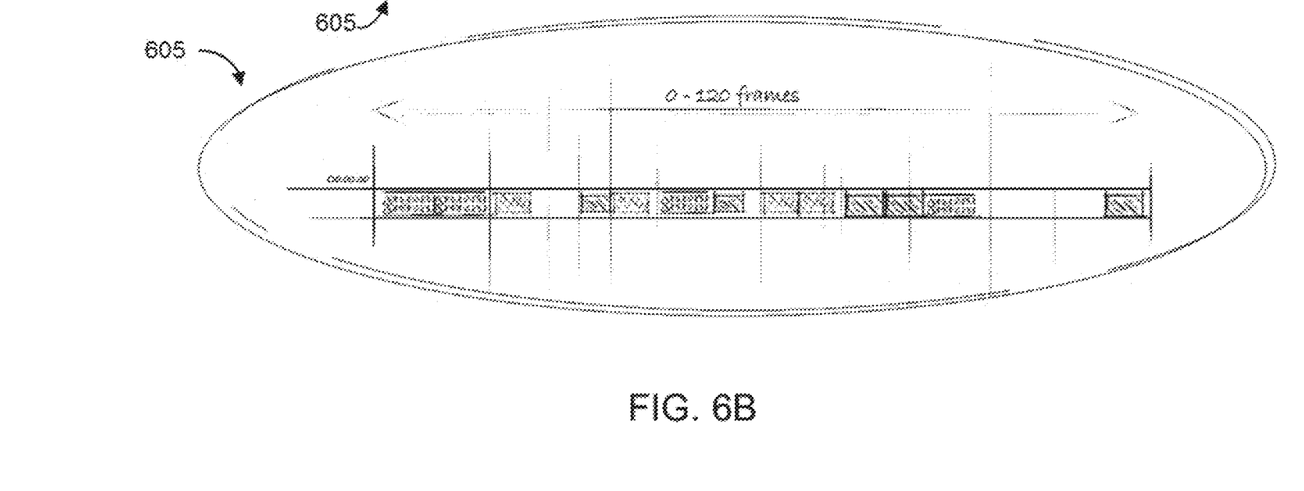

FIGS. 6A and 6B illustrate an example sequence 600 of video frames for a video according to one embodiment of the present disclosure. The embodiment of the example sequence 600 shown in FIGS. 6A and 6B is for illustration only. Other embodiments of the example sequence 600 could be used without departing from the scope of the present disclosure.

Sequence 600 illustrates an example of varying the time intervals between full screen display of RGB frames. In this illustrative example, sequence 600 shows types of frames included in an example video (e.g., MP4 or other video type) that are displayed at 60 frames a second for a minute equaling 3600 frames. As illustrated in FIG. 6A, the sequence 600 includes a first portion 605 of 120 frames the RGB colors are flashed in a rapid succession and a second portion 610 after first 120 frames where the RGB colors are displayed in steady patterns. FIG. 6B provides additional details showing the frames of different RGB colors as indicated according to the legend 615. As illustrated by this example, during the first portion 605 the video is able to shock the pixels of the display with rapid transitions and then to allow the pixels to display a color for a longer period of time during the second portion 610.

In these illustrative embodiments, the video generation system 405 generates different versions of the videos, for example, by varying and/or incorporating any of the above described video pattern or algorithm elements. The different versions of the videos may be generated to be uniquely suited for a particular type of the electronic devices 415. For example, without limitation, the electronic devices 415 may have different screen sizes, aspect ratios, display technologies (e.g., AMOLED versus non-AMOLED), or amounts of time exposed to screen burn-in conditions. For example, tablets may have a certain display demonstration or unique location of consistently displayed graphics causing the tablet to be susceptible to a certain type of screen burn-in as opposed to a smart phone or television. In another example, electronic devices that have been on display in a retail location longer that other devices may have a more advanced state of screen burn-in or may be more susceptible to screen burn-in. For example, without limitation, certain types of the electronic devices 415 may benefit from longer verses shorter lengths of the video, more verses less creative transition types in the video, or more verses less of the rapid transitions such as in the first portion 605. In one particular example, an electronic device in need of burn-in remediation may benefit from the use of the rapid transitions, whereas an electronic device with little or no burn-in only needing burn-in prevention may benefit from display of RGB colors in steady patterns.

Accordingly, the system 400 includes a CMS 410 that manages distribution of the various possible video versions to the electronic devices 415. For example, the CMS 410 may be implemented by the server 104. The CMS 410 identifies information about the electronic devices 415 to determine the version and parameters of the video to be displayed by the electronic devices 415. For example, the CMS 410 may determine a device identifier of the electronic device to determine information including screen size, aspect ratio, display technology, or the amount of time the device has been deployed in a retail or other type of display heavy environment. For example, the CMS 410 may connect to the electronic devices 415 (e.g., by using a dedicated WiFi channel from an AP in a retail location) and/or maintain a database for such information. The CMS 410 may also identify a display location identifier for the device (e.g., an identifier of a retail location) to determine parameters of the video, such as, for example, one or more times to play the video or automatically enter a night mode based on the location of the display device. For example, the CMS 410 may identify store hours and associated time zone for the retail location and determine parameters for times to play the video or automatically enter a night mode that will not conflict with the store hours.

Using some or all of this identified information, the CMS 410 selects one or more versions of the video for a particular one of the electronic devices 415 as well as the parameters for the video and sends the video version(s) and instructions for the video parameters to the electronic device 415 for the electronic device 415 to display the video version(s) according to the parameters. For example, the CMS 410 may select a particular video version that has been tested and designed to reduce, remediate, and/or prevent screen burn-in. Additionally, the CMS 410 may remotely control or change the video duration, start time, end time, and/or frequency (e.g., daily, weekly, monthly). The CMS 410 can then intelligently push the correct screen burn-in prevention video to the particular electronic devices 415 (e.g., using a bootstrap Android application package (APK)).

Figure 7:
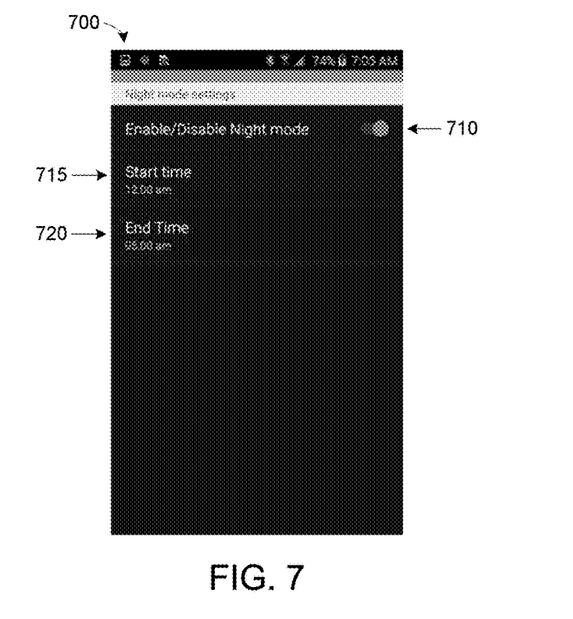
FIG. 7 illustrates an example screen for managing a night mode for reducing screen burn-in on an electronic device according to one embodiment of the present disclosure.

FIG. 7 illustrates an example screen 700 for managing a night mode for reducing screen burn-in on an electronic device according to one embodiment of the present disclosure. The example screen 700 for managing a night mode for reducing screen burn-in on an electronic device shown in FIG. 7 is for illustration only. Other embodiments may be used without departing from the scope of the present disclosure.

In this illustrative example, the screen 700 allows for management a night mode where the display of an electronic device 415 is powered off for a period of time to reducing screen burn-in on the electronic device 415. Screen 700 includes a switch 710 to enable the night mode as well as selections 715 and 720 for start and end times of the night mode. The night mode may be managed by a user of the electronic device 415 or may be remotely enabled and configured by the CMS 410.

Figure 8:
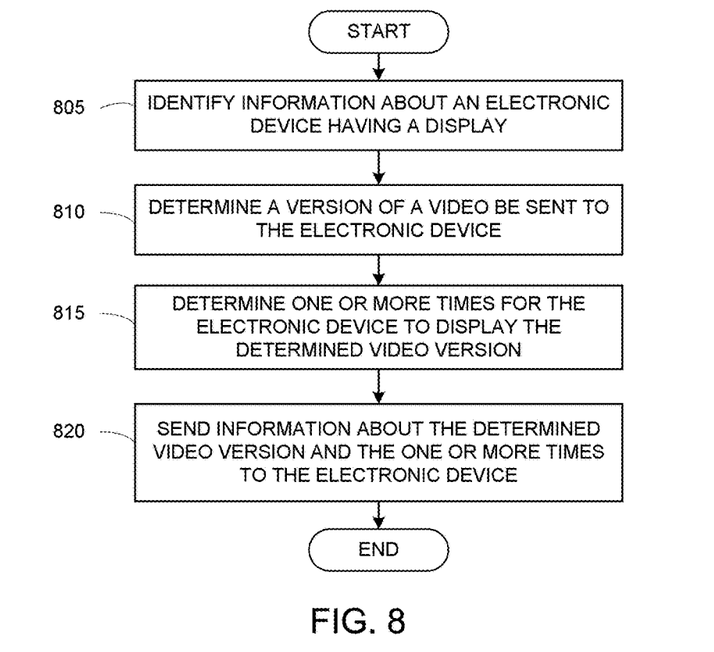
FIG. 8 illustrates a process for managing screen burn-in in accordance with various embodiments of the present disclosure.

FIG. 8 illustrates a process for managing screen burn-in in accordance with various embodiments of the present disclosure. For example, the process depicted in FIG. 8 may be performed by the server 104, the server 200, or the CMS 410 (referred to here as "the system") with respect to an electronic device such as any one of the client devices 106-114, the electronic device 300, or any one of the electronic devices 415.

The process begins with the system identifying information about an electronic device having a display (block 805). For example, in block 805, the system may identify information including a device identifier and a display location identifier for determining the video version and video parameters.

The system then determines a version of a video be sent to the electronic device (block 810). For example, in block 810, the system may determine the video version based on the identified information by selecting the version based on a type of the electronic device indicated by the device identifier.

The video includes display of a sequence of different colors for different durations designed to at least remediate or reduce screen burn-in of the display. For example, the video may include a plurality of different versions one or more of the versions designed for each of a plurality of different device types. The different versions of the video include different sequences of colors and different display durations for the sequences. The sequence of different colors may include separate displays of red, green, and blue colors with display of black or white during transition between two of the separate color displays. The display of the sequence of different colors may further include different transition types between display of at least some of the different colors with the different transition types include at least one of top to bottom, left to right, and edge to center. For a first portion, the video may include flashes of red, green, and blue colors in a rapid succession and then separate displays of red, green, and blue colors in a second portion with transitions between the displays of the colors in the second portion occurring less frequently than transitions between the flashes of the colors in the first portion.

The system then determines one or more times for the electronic device to display the determined video version (block 815). For example, in block 815, the system may determine a time of day for the electronic device to display the determined video version based at least in part on the display location identifier. Additionally in block 815, the system may determine a length of time for the determined video version to be displayed based the type of the electronic device and on how long the electronic device has been on display at a location indicated by the display location identifier.

The system then sends information about the determined video version and the one or more times to the electronic device (block 820). For example, in block 820, the system may send the video version and instruction for the video parameters. In another example, the system may direct another device to send the video or may send the video a simply a set of instructions for color patterns, durations, and transitions, without actually sending a video file (e.g., an MP4 file). Thereafter, the electronic device displays the video at the time(s) and frequency specified to remediate, reduce, and/or prevent screen burn-in.

Although FIG. 8 illustrates an examples of process for managing screen burn-in various changes could be made to FIG. 8. For example, while shown as a series of steps, various steps in each FIG. could overlap, occur in parallel, occur in a different order, or occur multiple times.

As discussed herein, embodiments of the present disclosure provide for the management of screen burn-in remediation, reduction, and/or prevention. Embodiments of the present disclosure intelligently and remotely select and control screen burn-in video display for a variety of remotely located display devices. The screen burn-in remediation, reduction, and/or prevention management disclosed herein save, prevent, and/or delay costs associated with damaged displays as well as allow display devices to maintain their display capabilities.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for managing screen burn-in, the method comprising:
identifying information about an electronic device having a display, wherein the information identified about the electronic device includes a display location identifier;
determining a version of a video to be sent to the electronic device for the electronic device to display the determined video version based on the identified information;
determining a time of day for the electronic device to display the determined video version based at least in part on the display location identifier;
determining a length of time for the determined video version to be displayed based at least in part on how long the electronic device has been on display at a location indicated by the display location identifier; and
sending information about the determined video version, the time of day, and the length of time to the electronic device,
wherein the video includes display of a sequence of different colors for different durations designed to at least remediate or reduce screen burn-in of the display.

2. The method of claim 1, wherein the information identified about the electronic device further includes a device identifier.

3. The method of claim 2, wherein:
determining the version of the video to send to the electronic device comprises selecting the version based on a type of the electronic device indicated by the device identifier,
the video has a plurality of different versions one or more of the versions designed for each of a plurality of different device types of which the type of the electronic device is one, and
the different versions of the video include different sequences of colors and different display durations for the sequences.

4. The method of claim 1, wherein the sequence of different colors includes separate displays of red, green, and blue colors with display of black or white color variations during transition between two of the separate color displays.

5. The method of claim 1, wherein:
the display of the sequence of different colors includes different transition types between display of at least some of the different colors, and
the different transition types include at least one of top to bottom, left to right, and edge to center.

6. The method of claim 1, wherein:
for a first portion, the video includes flashes of red, green, and blue colors in a rapid succession, and
for a second portion, the video includes separate displays of red, green, and blue colors with transitions between the displays of the colors in the second portion occurring less frequently than transitions between the flashes of the colors in the first portion.

7. The method of claim 1, wherein:
the display of the sequence of different colors includes different transition types between display of at least some of the different colors,
the different transition types include at least one of top to bottom, left to right, and edge to center,
for a first portion, the video includes flashes of red, green, and blue colors in a rapid succession, and
for a second portion, the video includes separate displays of red, green, and blue colors with transitions between the displays of the colors in the second portion occurring less frequently than transitions between the flashes of the colors in the first portion.

8. A system for managing screen burn-in, the system comprising:
a memory;
at least one processor operably connected to the memory, the at least one processor configured to:
identify information about an electronic device having a display, wherein the information identified about the electronic device includes a display location identifier;
determine a version of a video to be sent to the electronic device for the electronic device to display the determined video version based on the identified information;
determine a time of day for the electronic device to display the determined video version based at least in part on the display location identifier; and
determine a length of time for the determined video version to be displayed based at least in part on how long the electronic device has been on display at a location indicated by the display location identifier; and a communication interface configured to send information about the determined video version, the time of day, and the length of time to the electronic device, wherein the video includes display of a sequence of different colors for different durations designed to at least remediate or reduce screen burn-in of the display.

9. The system of claim 8, wherein the information identified about the electronic device further includes a device identifier.

10. The system of claim 9, wherein:

the at least one processor is configured to select the version based on a type of the electronic device indicated by the device identifier, the video has a plurality of different versions one or more of the versions designed for each of a plurality of different device types of which the type of the electronic device is one, and the different versions of the video include different sequences of colors and different display durations for the sequences.

11. The system of claim 8, wherein the sequence of different colors includes separate displays of red, green, and blue colors with display of black or white color variations during transition between two of the separate color displays.

12. The system of claim 8, wherein:

the display of the sequence of different colors includes different transition types between display of at least some of the different colors, and the different transition types include at least one of top to bottom, left to right, and edge to center.

13. The system of claim 8, wherein:

for a first portion, the video includes flashes of red, green, and blue colors in a rapid succession, and for a second portion, the video includes separate displays of red, green, and blue colors with transitions between the displays of the colors in the second portion occurring less frequently than transitions between the flashes of the colors in the first portion.

14. The system of claim 8, wherein:

the display of the sequence of different colors includes different transition types between display of at least some of the different colors, the different transition types include at least one of top to bottom, left to right, and edge to center, for a first portion, the video includes flashes of red, green, and blue colors in a rapid succession, and for a second portion, the video includes separate displays of red, green, and blue colors with transitions between the displays of the colors in the second portion occurring less frequently than transitions between the flashes of the colors in the first portion.

15. A non-transitory computer-readable medium comprising program code that, when executed by at least one processor, causes a system to:

identify information about an electronic device having a display, wherein the information identified about the electronic device includes a display location identifier;

determine a version of a video to be sent to the electronic device for the electronic device to display the determined video version based on the identified information;

determine a time of day for the electronic device to display the determined video version based at least in part on the display location identifier;

determine a length of time for the determined video version to be displayed based at least in part on how long the electronic device has been on display at a location indicated by the display location identifier; and send information about the determined video version, the time of day, and the length of time to the electronic device, wherein the video includes display of a sequence of different colors for different durations designed to at least remediate or reduce screen burn-in of the display.

16. The computer-readable medium of claim 15, wherein the information identified about the electronic device further includes a device identifier.

17. The computer-readable medium of claim 16, wherein:

the program code that causes the system to determine the version of a video to be sent to the electronic device comprises program code that, when executed by at least one processor, causes the system to select the version based on a type of the electronic device indicated by the device identifier, the video has a plurality of different versions one or more of the versions designed for each of a plurality of different device types of which the type of the electronic device is one, and the different versions of the video include different sequences of colors and different display durations for the sequences.

18. The computer-readable medium of claim 15, wherein:

the sequence of different colors includes separate displays of red, green, and blue colors with display of black or white color variations during transition between two of the separate color displays.

19. The computer-readable medium of claim 15, wherein:

the display of the sequence of different colors includes different transition types between display of at least some of the different colors, and the different transition types include at least one of top to bottom, left to right, and edge to center.

20. The computer-readable medium of claim 15, wherein:

for a first portion, the video includes flashes of red, green, and blue colors in a rapid succession, and for a second portion, the video includes separate displays of red, green, and blue colors with transitions between the displays of the colors in the second portion occurring less frequently than transitions between the flashes of the colors in the first portion.

* * * * *